US012693619B2

(12) United States Patent
Akuta

(10) Patent No.: US 12,693,619 B2
(45) Date of Patent: Jul. 28, 2026

(54) IMAGE FORMING APPARATUS

(71) Applicant: FUJIFILM Business Innovation Corp., Tokyo (JP)

(72) Inventor: Tomokazu Akuta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/072,930

(22) Filed: Mar. 6, 2025

(65) Prior Publication Data

US 2026/0079439 A1 Mar. 19, 2026

(30) Foreign Application Priority Data

Sep. 18, 2024 (JP) ................................ 2024-161329

(51) Int. Cl.
*G03G 15/00* (2006.01)
*G03G 21/16* (2006.01)

(52) U.S. Cl.
CPC ......... *G03G 15/80* (2013.01); *G03G 21/1685* (2013.01); *G03G 2215/00978* (2013.01); *G03G 2221/1639* (2013.01)

(58) Field of Classification Search
CPC ............... G03G 15/5004; G03G 15/80; G03G 21/1652; G03G 21/1685; G03G 2215/00978; G03G 2221/1639
See application file for complete search history.

(56) References Cited

U.S. PATENT DOCUMENTS

| | | | | |
|---|---|---|---|---|
| 11,262,685 | B1 * | 3/2022 | Shinohara | G03G 15/2039 |
| 2021/0223727 | A1 * | 7/2021 | Suzuki | G03G 15/2039 |
| 2024/0142907 | A1 * | 5/2024 | Sobue | G03G 15/5004 |

FOREIGN PATENT DOCUMENTS

| | | |
|---|---|---|
| JP | 2007049893 | 2/2007 |
| JP | 2017021234 | 1/2017 |

* cited by examiner

*Primary Examiner* — Hoang X Ngo
(74) *Attorney, Agent, or Firm* — JCIPRNET

(57) ABSTRACT

An image forming apparatus includes an attachment section to which a first fixing unit that performs a fixing operation of fixing an image on a recording material by using power from an alternating current power supply and a second fixing unit that performs the fixing operation by using power from a direct current power supply are attached, an alternating current power supply section that receives the power supplied from the alternating current power supply, and a direct current power supply section that receives the power supplied from the direct current power supply, in which the attachment of the first fixing unit to the attachment section and the supply of the power from the direct current power supply to the direct current power supply section are not executable simultaneously, and the attachment of the second fixing unit to the attachment section and the supply of the power from the alternating current power supply to the alternating current power supply section are not executable simultaneously.

10 Claims, 11 Drawing Sheets

IMAGE FORMING APPARATUS

CROSS-REFERENCE TO RELATED APPLICATIONS

This application is based on and claims priority under 35 USC 119 from Japanese Patent Application No. 2024-161329 filed Sep. 18, 2024.

BACKGROUND

(i) Technical Field

The present invention relates to an image forming apparatus.

(ii) Related Art

JP2017-21234A discloses an image forming apparatus that receives power supplied from a commercial power supply and that includes a capacitor unit that functions as a battery. The image forming apparatus supplies the alternating current power to a main power supply as long as the alternating current is input from the commercial power supply. Meanwhile, in a case in which a power failure occurs, the power stored in the capacitor unit is converted into the alternating current by an inverter and is supplied to the main power supply.

SUMMARY

There is an image forming apparatus to which a fixing unit that performs a fixing operation using power from an alternating current power supply and a fixing unit that performs a fixing operation using power from a direct current power supply can be attached. In such an image forming apparatus, in a case in which power that cannot be used for each fixing unit is supplied, a defect may occur in the fixing unit. For example, in a case in which the power from the direct current power supply is supplied to the fixing unit that performs the fixing operation using the power from the alternating current power supply, a defect may occur in the fixing unit.

Aspects of non-limiting embodiments of the present disclosure relate to an image forming apparatus to which a fixing unit that performs a fixing operation using power from an alternating current power supply and a fixing unit that performs a fixing operation using power from a direct current power supply can be attached, and that prevents power that cannot be used for the fixing unit from being supplied.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including an attachment section to which a first fixing unit that performs a fixing operation of fixing an image on a recording material by using power from an alternating current power supply and a second fixing unit that performs the fixing operation by using power from a direct current power supply are attached, an alternating current power supply section that receives the power supplied from the alternating current power supply, and a direct current power supply section that receives the power supplied from the direct current power supply, in which the attachment of the first fixing unit to the attachment section and the supply of the power from the direct current power supply to the direct current power supply section are not executable simultaneously, and the attachment of the second fixing unit to the attachment section and the supply of the power from the alternating current power supply to the alternating current power supply section are not executable simultaneously.

BRIEF DESCRIPTION OF THE DRAWINGS

Exemplary embodiment(s) of the present invention will be described in detail based on the following figures, wherein.

Figure 6:
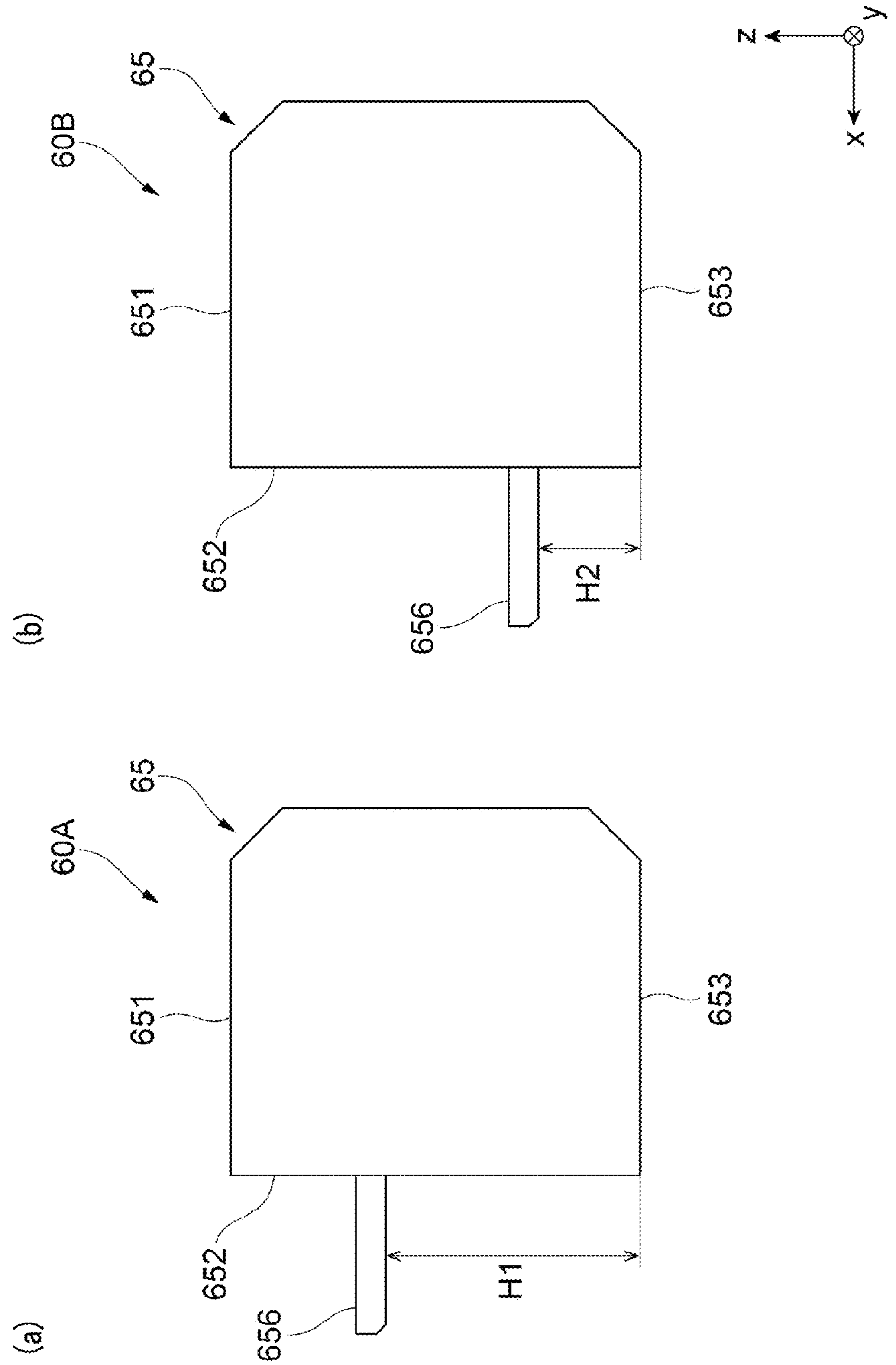
Figure 7:
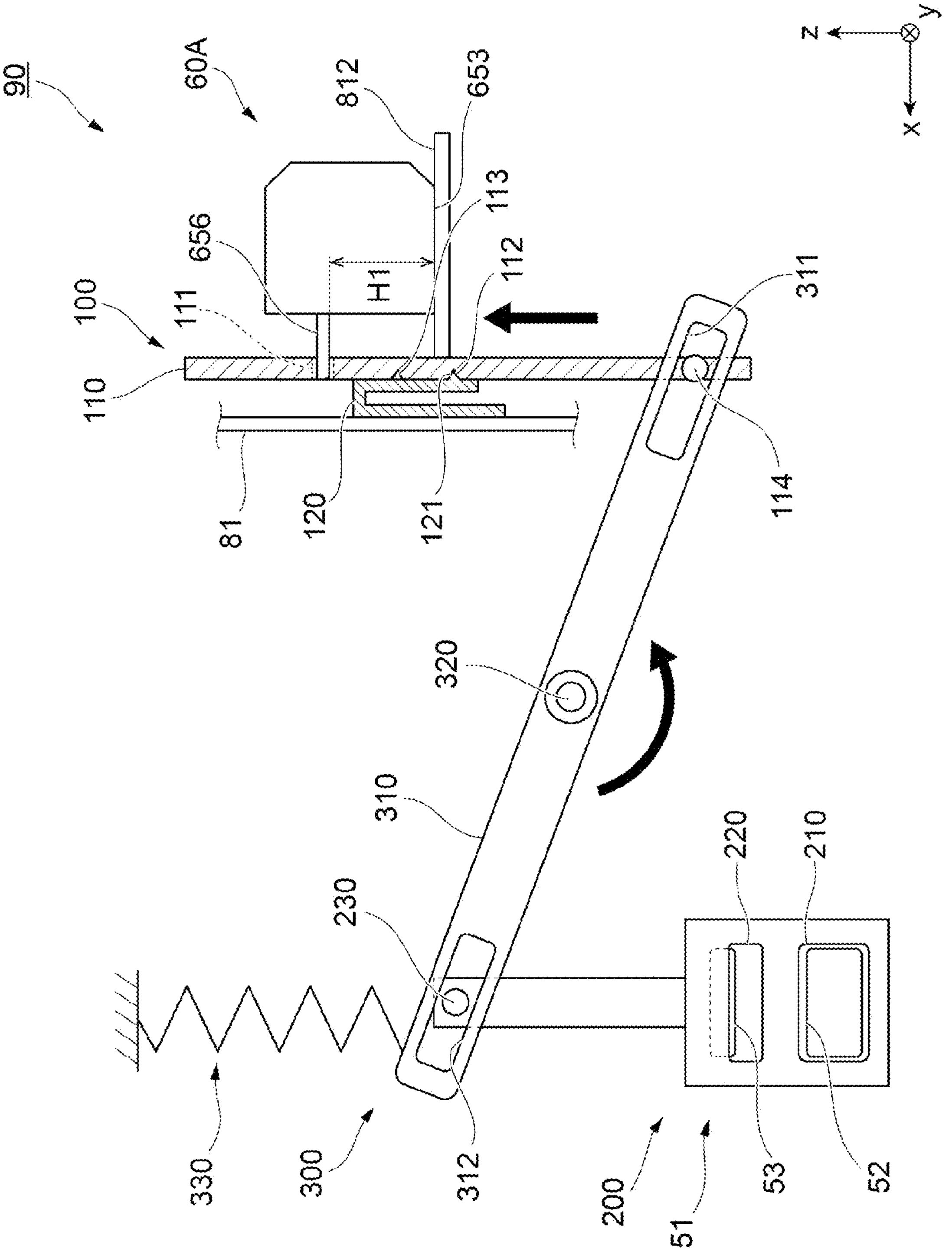
Figure 8:
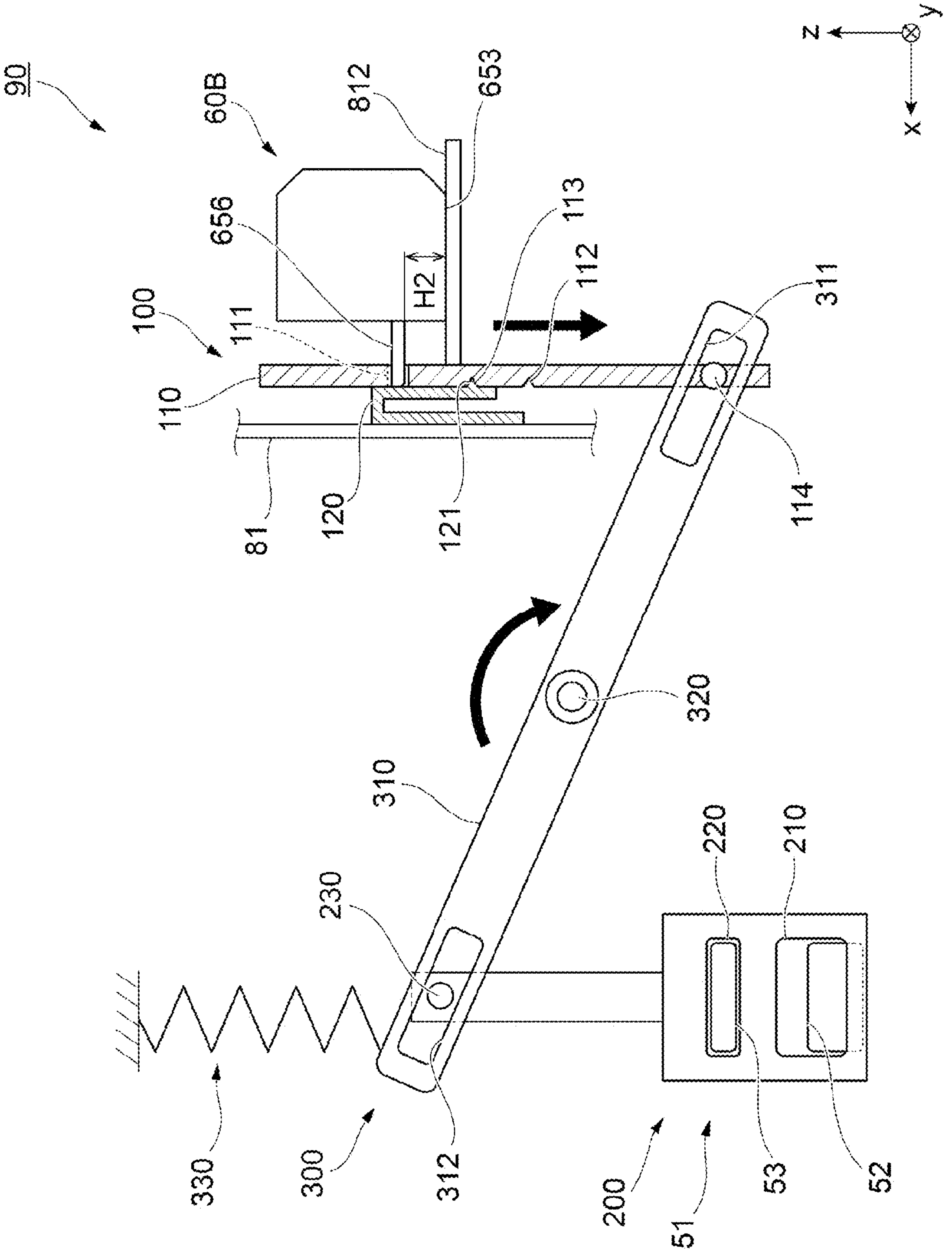
Figure 9:
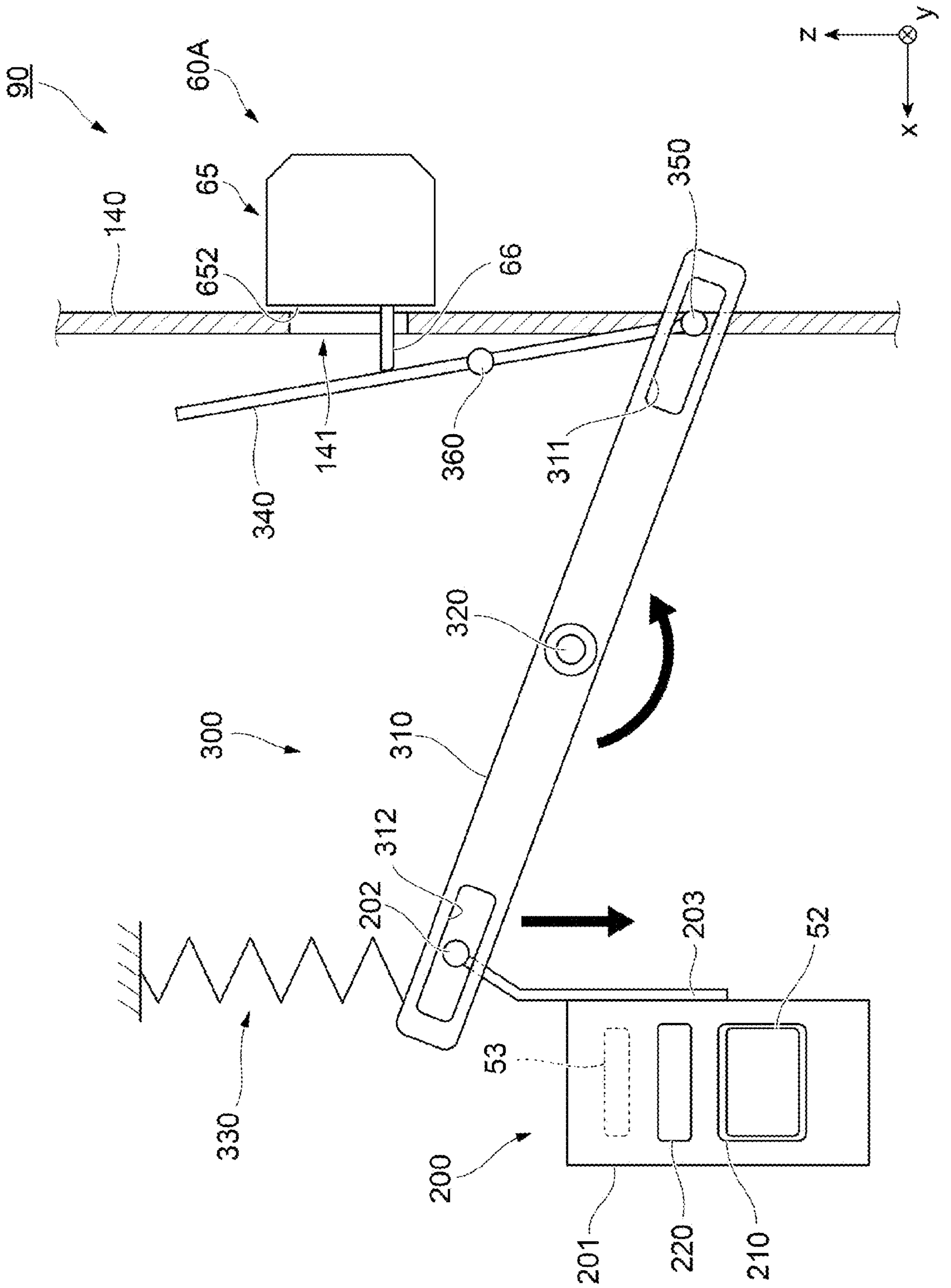
Figure 10:
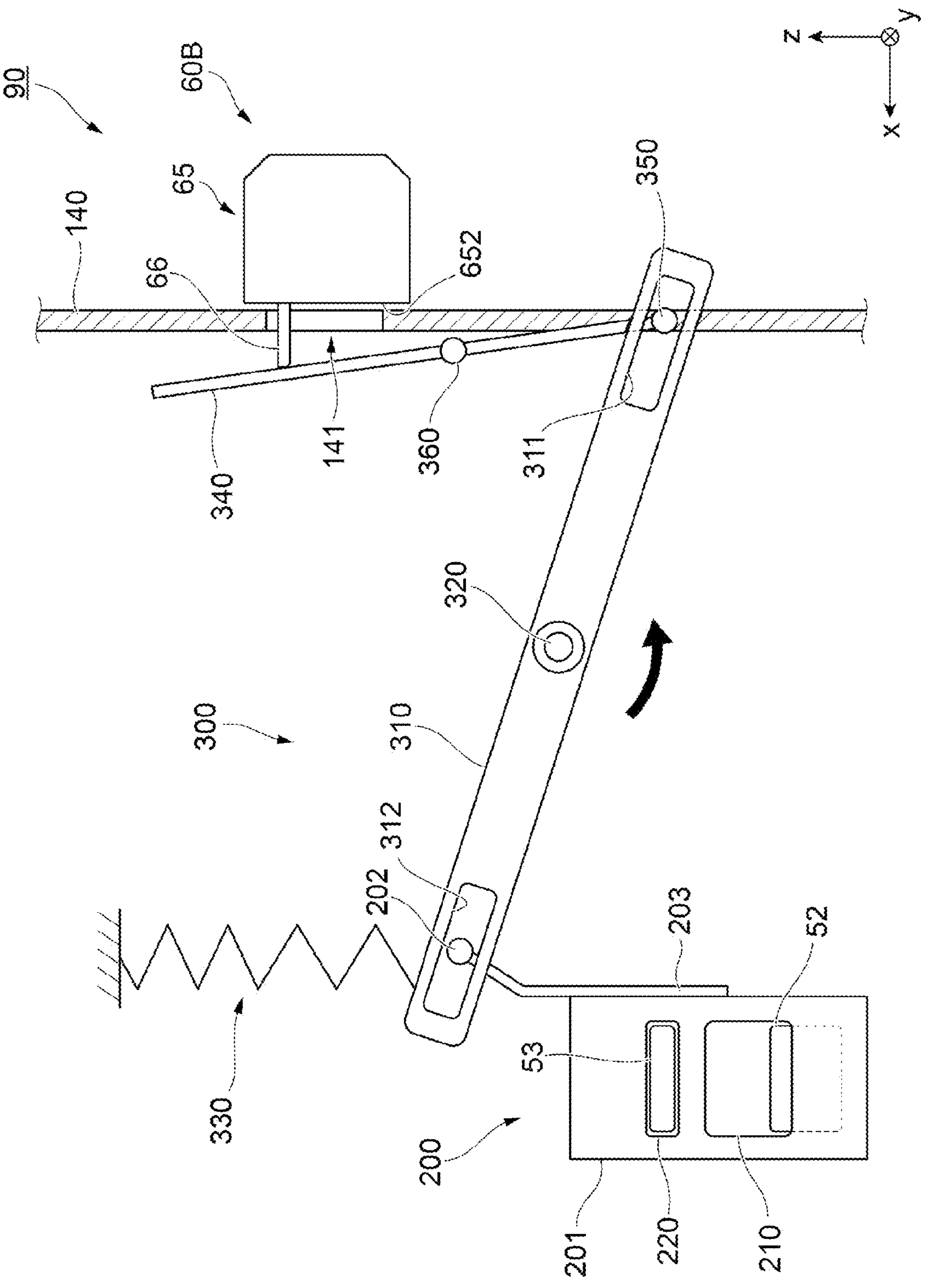

(a) and (b) of FIG. 6 are diagrams showing an example of a configuration of the fixing unit;

FIG. 7 is a diagram showing an example of a configuration of a switching mechanism to which the present exemplary embodiment is applied;

FIG. 8 is a diagram showing an example of a configuration of the switching mechanism to which the present exemplary embodiment is applied;

FIG. 9 is a diagram showing the switching mechanism in a first state;

FIG. 10 is a diagram showing the switching mechanism in a second state; and

Figure 11:
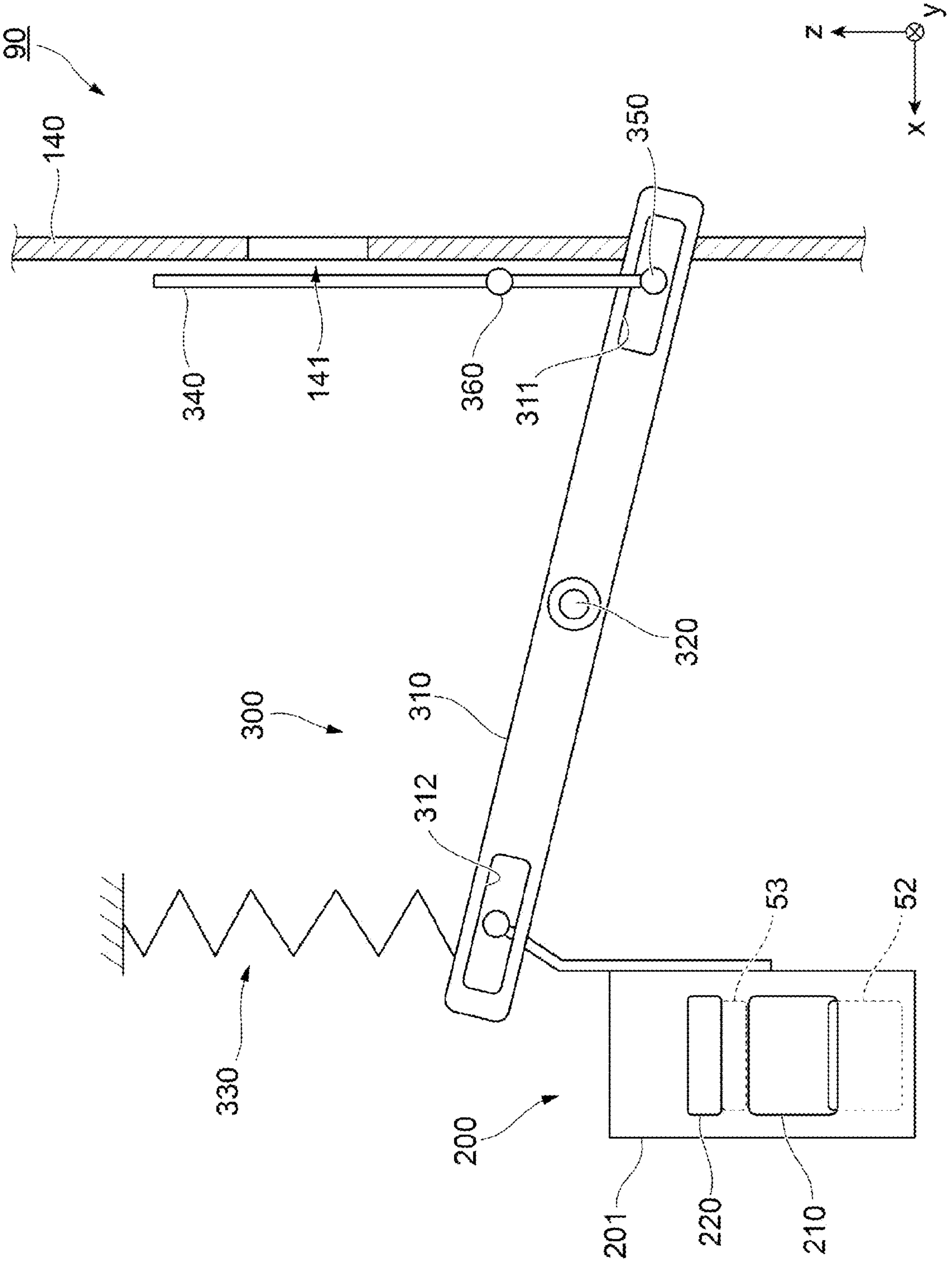

FIG. 11 is a view showing the switching mechanism in a third state.

DETAILED DESCRIPTION

Hereinafter, exemplary embodiments of the present invention will be described in detail with reference to the accompanying drawings.

Exemplary Embodiment 1

Overall Configuration of Image Forming Apparatus 1

Figure 1:
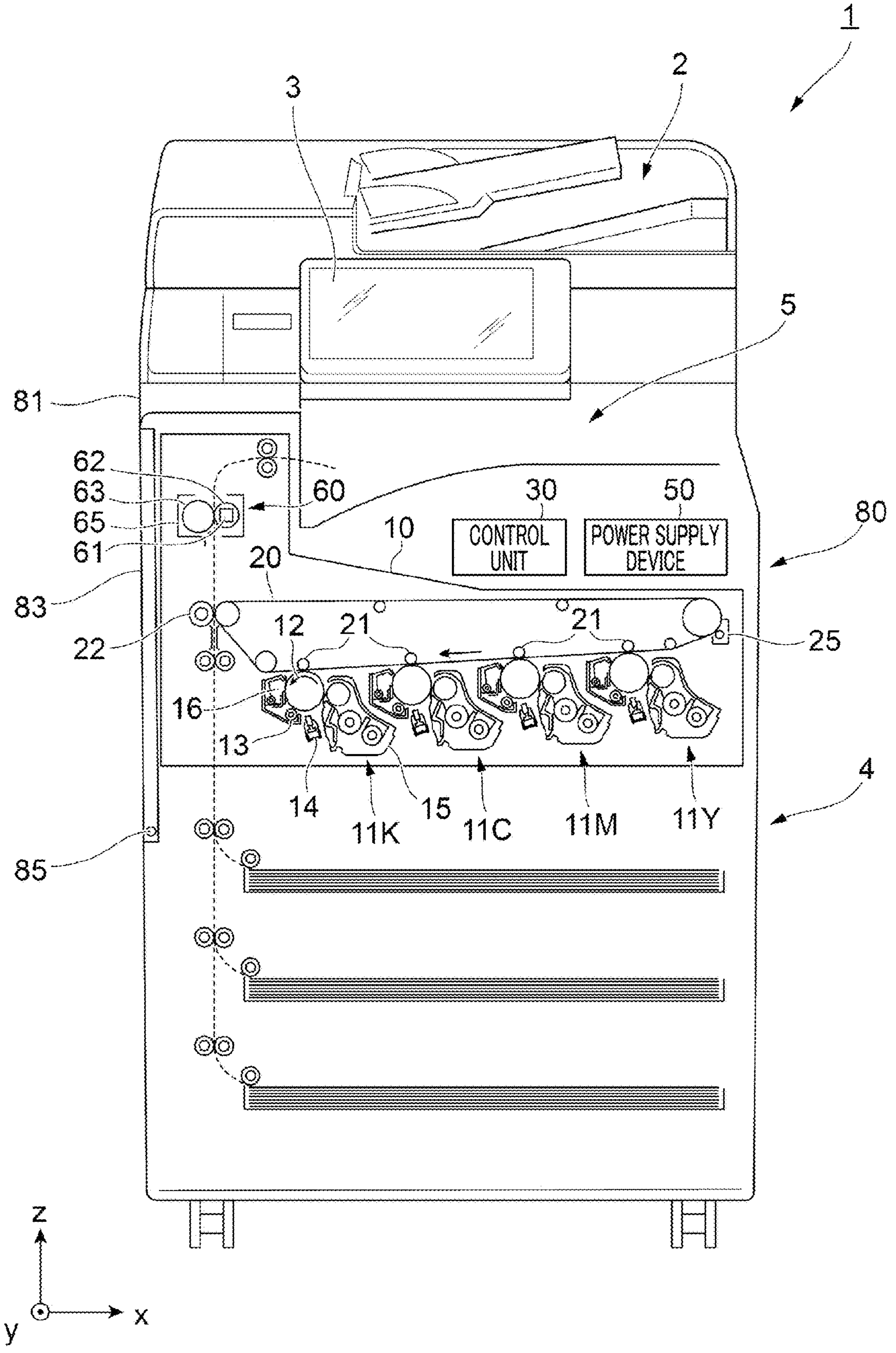
FIG. 1 is an overall diagram of an image forming apparatus to which the present exemplary embodiment is applied.

FIG. 1 is an overall diagram of an image forming apparatus 1 to which the present exemplary embodiment is applied. FIG. 1 shows the image forming apparatus 1 such that a front side of the image forming apparatus 1 is a front side of a paper surface. In FIG. 1, a right direction on the paper surface is a +x direction, the front side on the paper surface is a +y direction, an up direction on the paper surface is a +z direction, and the opposite directions are −x, −y, and −z directions.

Figure 2:
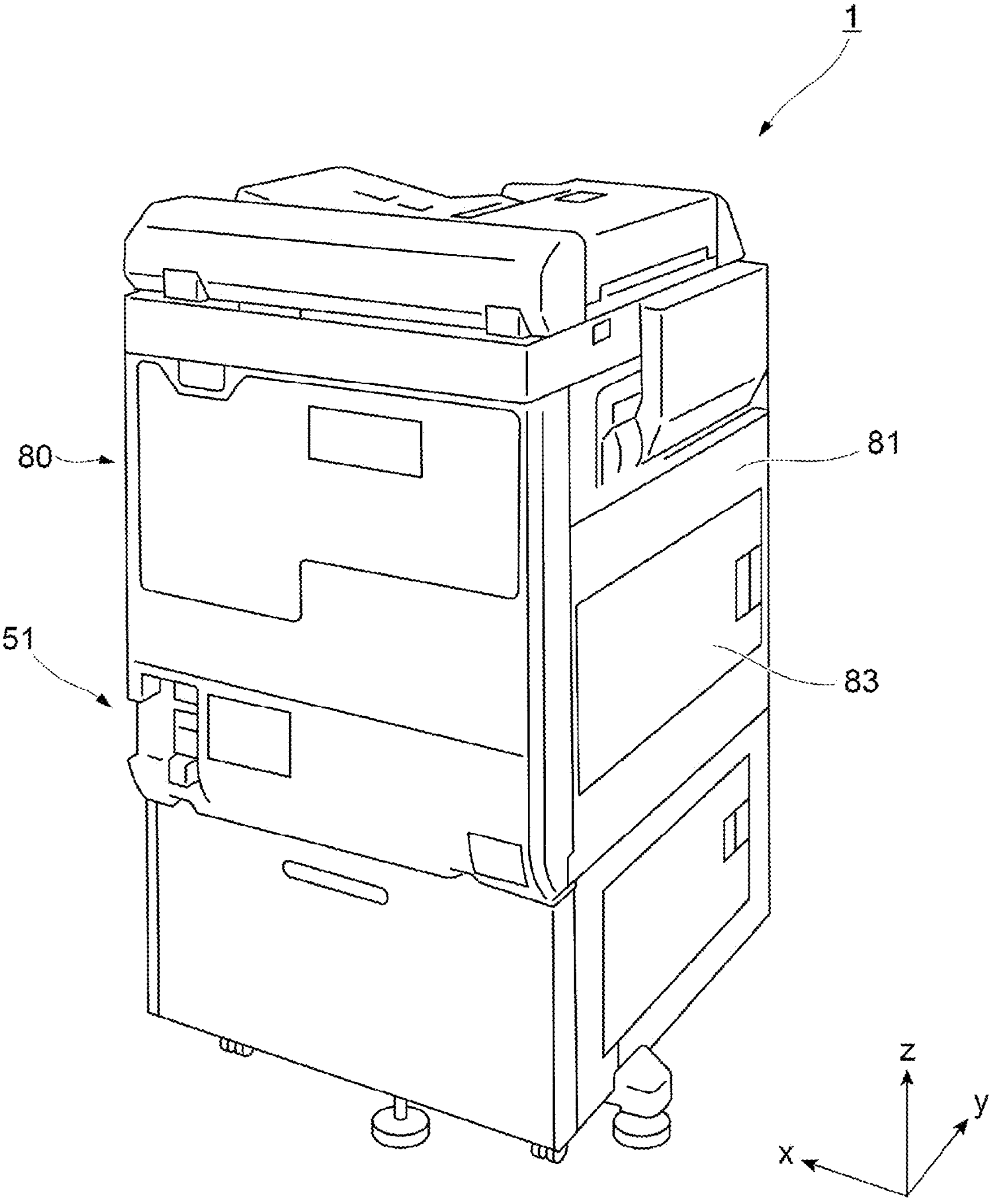
FIG. 2 is a diagram of the image forming apparatus to which the present exemplary embodiment is applied, as viewed from a rear side.

FIG. 2 is a diagram of the image forming apparatus 1 to which the present exemplary embodiment is applied, as viewed from a rear side.

The image forming apparatus 1 includes an image forming section 10 that forms an image on paper. In addition, the image forming apparatus 1 includes a control unit 30 that controls an operation of the entire image forming apparatus 1. In addition, the image forming apparatus 1 includes a power supply device 50 that supplies power to each section of the image forming apparatus 1. As shown in FIG. 1, the image forming section 10, the control unit 30, and the power supply device 50 are accommodated inside a housing 80 of the image forming apparatus 1.

In addition, the image forming apparatus 1 includes an image reading section 2 that reads an image. In addition, the image forming apparatus 1 includes an operation display section 3 that displays information to a user and receives an operation input from the user. In addition, the image forming apparatus 1 includes a paper feeding section 4 that supplies the paper to the image forming section 10 and a paper discharge section 5 that discharges the paper on which the image is formed by the image forming section 10.

The image forming section 10 includes four image forming units 11Y, 11M, 11C, and 11K that are disposed in parallel at regular intervals. Hereinafter, in a case in which the four image forming units 11Y, 11M, 11C, and 11K are not distinguished, the four image forming units 11Y, 11M, 11C, and 11K will be collectively referred to as an image forming unit 11.

Each image forming unit 11 includes a photoconductor drum 12 that forms an electrostatic latent image and holds a toner image. In addition, each image forming unit 11 includes a charging device 13 that charges a surface of the photoconductor drum 12 at a predetermined potential. In addition, each image forming unit 11 includes an exposure device 14 that exposes the photoconductor drum 12 charged by the charging device 13 based on each color image data. In addition, each image forming unit 11 includes a developing device 15 that develops the electrostatic latent image formed on the photoconductor drum 12. In addition, each image forming unit 11 includes a drum cleaner 16 that cleans the surface of the photoconductor drum 12 after transfer. The respective image forming units 11 are configured in the same manner except that the toner to be housed in the developing device 15 is different, and form the toner images of yellow (Y), magenta (M), cyan (C), and black (K), respectively.

In addition, the image forming section 10 includes an intermediate transfer belt 20 on which the toner image of each color formed on the photoconductor drum 12 of each image forming unit 11 is to be transferred in multiple. In addition, the image forming section 10 includes a primary transfer roll 21 that sequentially transfers the toner image of each color formed by each image forming unit 11 to the intermediate transfer belt 20. In addition, the image forming section 10 includes a secondary transfer roll 22 that collectively transfers the toner images of each color, which are superimposed and transferred on the intermediate transfer belt 20, to the paper. In addition, the image forming section 10 includes a belt cleaner 25 that cleans a surface of the intermediate transfer belt 20 after the secondary transfer.

In addition, the image forming section 10 includes a fixing unit 60 that performs a fixing operation of fixing the secondary-transferred toner image of each color to the paper. The fixing unit 60 is configured detachably with respect to a body portion 81 of the housing 80 of the image forming apparatus 1, which will be described later.

The fixing unit 60 according to the present exemplary embodiment includes an AC fixing unit 60A (see (a) of FIG. 6 to be described later) that performs the fixing operation using power from an alternating current power supply and a DC fixing unit 60B (see (b) of FIG. 6 to be described later) that performs the fixing operation using power from a direct current power supply. The AC fixing unit 60A is an example of a first fixing unit, and the DC fixing unit 60B is an example of a second fixing unit. Then, in the image forming apparatus 1, any one of the AC fixing unit 60A or the DC fixing unit 60B is selected and attached to an attachment section 100 (see FIG. 7 to be described later) to be described later.

Hereinafter, in a case in which the AC fixing unit 60A and the DC fixing unit 60B are not distinguished from each other, the fixing units 60A and 60B will be simply referred to as a fixing unit 60. In addition, the same components will be denoted by the same reference numerals in the description of the configuration common to the AC fixing unit 60A and the DC fixing unit 60B.

The fixing unit 60 includes a heater 61 that is a heating source. In addition, the fixing unit 60 includes a heating roll 62 that incorporates the heater 61 and a pressurizing roll 63 that is provided to be pressed against an outer peripheral surface of the heating roll 62. The fixing unit 60 heats and pressurizes the paper by interposing the paper between the heating roll 62 and the pressurizing roll 63.

The fixing unit 60 includes a unit frame 65, and the heater 61, the heating roll 62, and the pressurizing roll 63 are accommodated in the unit frame 65. Although details will be described later, a shape of the unit frame 65 of the fixing unit 60 is different between the AC fixing unit 60A and the DC fixing unit 60B.

In addition, the fixing unit 60 has a configuration in which a type of the heater 61 is different between the AC fixing unit 60A and the DC fixing unit 60B. The heater 61 in the AC fixing unit 60A is a heater for an alternating current power supply and heats the heating roll 62 by using the power supplied from the alternating current power supply. In addition, the heater of the DC fixing unit 60B is a heater for a direct current power supply and heats the heating roll 62 by using the power supplied from the direct current power supply. In addition, the AC fixing unit 60A cannot use the power supplied from the direct current power supply. Similarly, the DC fixing unit 60B cannot use the power supplied from the alternating current power supply.

The housing 80 has the body portion 81 and a cover portion 83 connected to the body portion 81 via a hinge 85. The cover portion 83 is provided to be openable and closable with respect to the body portion 81 by rotating about the hinge 85. Then, the cover portion 83 is opened with respect to the body portion 81, so that the fixing unit 60 provided inside the housing 80 is exposed to the outside of the image forming apparatus 1.

The power supply device 50 receives the power from the outside of the image forming apparatus 1 and supplies the power to each section of the image forming apparatus 1 including the fixing unit 60. The power supply device 50 includes a power supply section 51 that receives the power from the power supply provided outside the image forming apparatus 1. In addition, the power supply device 50 has a connector 55 (see FIG. 5 to be described later) that is electrically connected to the fixing unit 60 in a case in which the fixing unit 60 is attached to the body portion 81.

Figure 3:
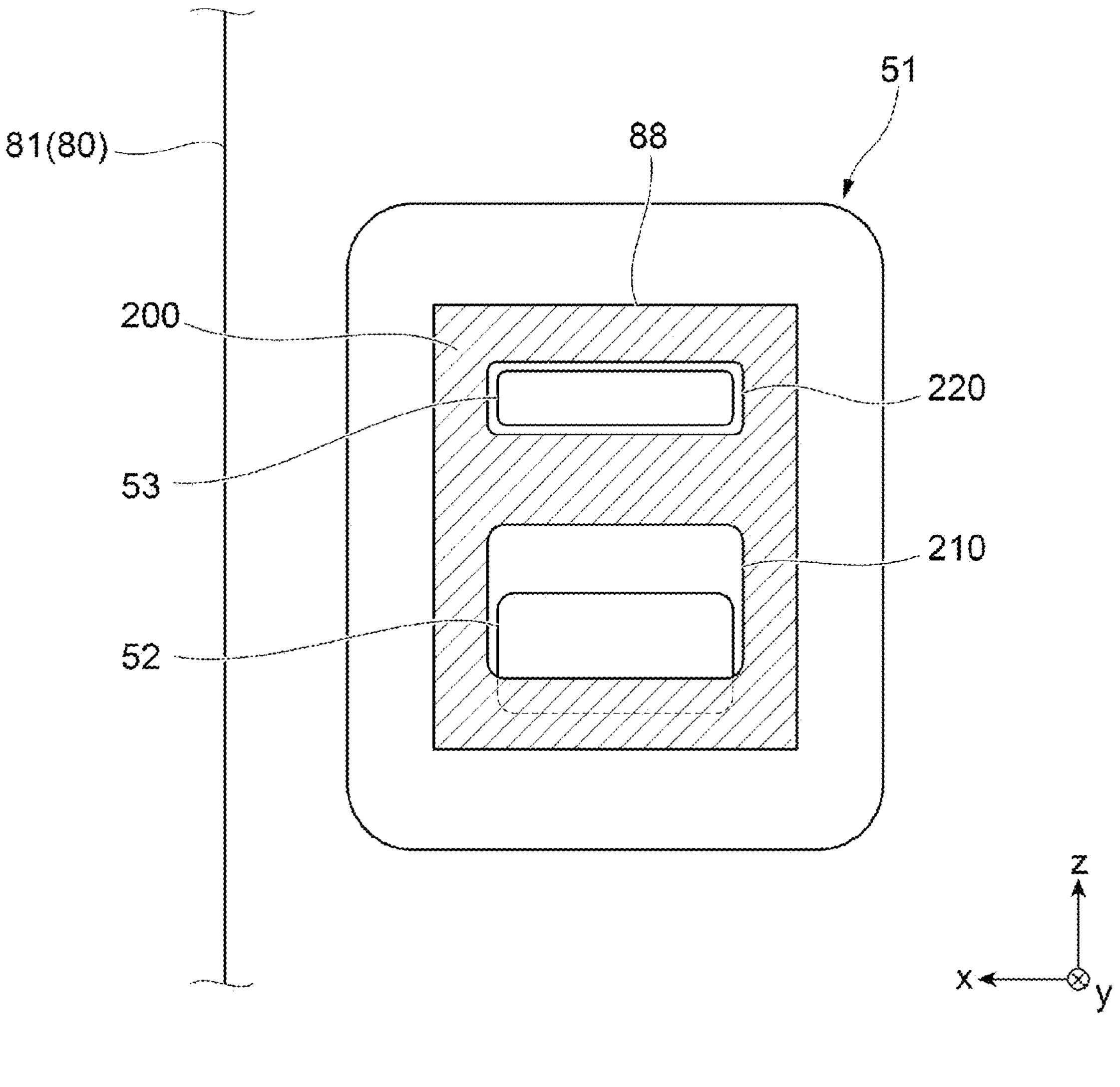
FIG. 3 is a diagram showing an example of a configuration of a power supply section to which the present exemplary embodiment is applied.

FIG. 3 is a diagram showing an example of a configuration of the power supply section 51 to which the present exemplary embodiment is applied.

The power supply section 51 is provided on a rear side of the image forming apparatus 1. In this example, the power supply section 51 is provided at a position facing an opening portion 88 provided on a rear side of the housing 80.

The power supply section 51 has an AC power supply port 52 into which an AC power supply cable (not shown) connected to the alternating current power supply is inserted and that receives the power supplied from the alternating current power supply. The AC power supply port 52 is an example of an alternating current power supply section. Examples of the alternating current power supply include a commercial power supply.

In addition, the power supply section 51 has a DC power supply port 53 into which a DC power supply cable (not shown) connected to the direct current power supply is inserted and that receives the power supplied from the direct current power supply. The DC power supply port 53 is an example of a direct current power supply section. Examples of the direct current power supply include a battery.

In the power supply section 51 according to the present exemplary embodiment, the AC power supply port 52 and the DC power supply port 53 are arranged in the +z direction. In addition, in this example, the AC power supply port 52 is disposed below the DC power supply port 53. In addition, in this example, shapes of the AC power supply port 52 and the DC power supply port 53 as viewed in the +y direction are rectangular.

In addition, the power supply section 51 according to the present exemplary embodiment is in a state in which at least one of the AC power supply port 52 or the DC power supply port 53 is blocked by a shutter member 200 provided inside the housing 80. In addition, the power supply section 51 according to the present exemplary embodiment is switched to any one of a state in which the AC power supply port 52 is blocked or a state in which the DC power supply port 53 is blocked, by the shutter member 200 moving in the ±z direction.

Here, the shutter member 200 blocking the AC power supply port 52 means that the shutter member 200 shields at least a part of the region of the AC power supply port 52, and the AC power supply cable cannot be inserted into the AC power supply port 52. That is, the shutter member 200 does not need to block the entire AC power supply port 52. The same applies to the DC power supply port 53.

In FIG. 3, a range in which the shutter member 200 is provided is shown by hatching. As shown in FIG. 3, the power supply section 51 blocks a part of the region of the AC power supply port 52 by the shutter member 200. In addition, the power supply section 51 is exposed to the outside through the DC power supply port 53 and an opening portion for DC 220 provided in the shutter member 200. Accordingly, the power supply section 51 is in a state in which the AC power supply cable cannot be inserted into the AC power supply port 52 and the DC power supply cable can be inserted into the DC power supply port 53.

An operation of the shutter member 200, a relationship between the shutter member 200 and the power supply section 51, and the like will be described in detail later.

Returning to FIG. 1, in the image forming apparatus 1 according to the present exemplary embodiment, image forming processing by the following process is performed under the operation control by the control unit 30.

That is, image data acquired from a PC (not shown) or the image reading section 2 is subjected to image processing by an image processing section (not shown) and is sent to each image forming unit 11 as the image data of each color. In each image forming unit 11, the charging device 13 charges the photoconductor drum 12, the exposure device 14 exposes the photoconductor drum 12, and the developing device develops the photoconductor drum 12, so that the toner image of each color is formed on the photoconductor drum 12.

The toner images of each color formed on the photoconductor drum 12 of each image forming unit 11 are sequentially electrostatically transferred to the intermediate transfer belt 20 by the primary transfer roll 21. Accordingly, a superimposed toner image in which the toner image of each color is superimposed is formed on the intermediate transfer belt 20. The superimposed toner image on the intermediate transfer belt 20 is transported to a secondary transfer section in which the secondary transfer roll 22 is disposed as the intermediate transfer belt 20 moves. The paper is supplied to the secondary transfer section from the paper feeding section 4 in accordance with a timing at which the superimposed toner image is transported to the secondary transfer section. The superimposed toner image is collectively transferred onto the paper by the secondary transfer roll 22 in the secondary transfer section.

Thereafter, the paper to which the superimposed toner image is transferred is transported to the fixing unit 60. The toner image on the paper transported to the fixing unit 60 receives heat and pressure from the fixing unit 60 and is fixed on the paper. Then, the paper on which the fixed image is formed is transported to the paper discharge section 5 of the image forming apparatus 1.

Meanwhile, the toner (primary transfer residual toner) adhering to the photoconductor drum 12 after the primary transfer and the toner (secondary transfer residual toner) adhering to the intermediate transfer belt 20 after the secondary transfer are removed by the drum cleaner 16 and the belt cleaner 25, respectively.

In this manner, the image forming processing in the image forming apparatus 1 is repeated for the number of cycles corresponding to the number of printed sheets.

Configuration of Switching Mechanism 90

As described above, the image forming apparatus 1 is configured such that the AC fixing unit 60A and the DC fixing unit 60B are attachable to and detachable from the body portion 81 of the housing 80.

In the image forming apparatus 1, in a case in which a type of the power that cannot be used is supplied to the fixing unit 60, a defect of the fixing unit 60 such as a failure of the heater 61 may occur. For example, in a case in which the power from the direct current power supply is supplied to the AC fixing unit 60A, a defect may occur in the AC fixing unit 60A. Similarly, in a case in which the power from the alternating current power supply is supplied to the DC fixing unit 60B, a defect may occur in the DC fixing unit 60B.

Meanwhile, the image forming apparatus 1 according to the present exemplary embodiment includes the attachment section 100 (see FIG. 7 described later) to which the fixing unit 60 is attached and a switching mechanism 90 (see FIG. 7) that switches a state of the shutter member 200 that blocks the power supply section 51. Then, by switching the states of the attachment section 100 and the shutter member 200 by the switching mechanism 90, the type of the power that cannot be used to the fixing unit 60 is prevented from being supplied.

Hereinafter, the attachment and detachment of the fixing unit 60 to the body portion 81 of the image forming apparatus 1 and a configuration of the switching mechanism 90 will be described in detail.

Figure 4:
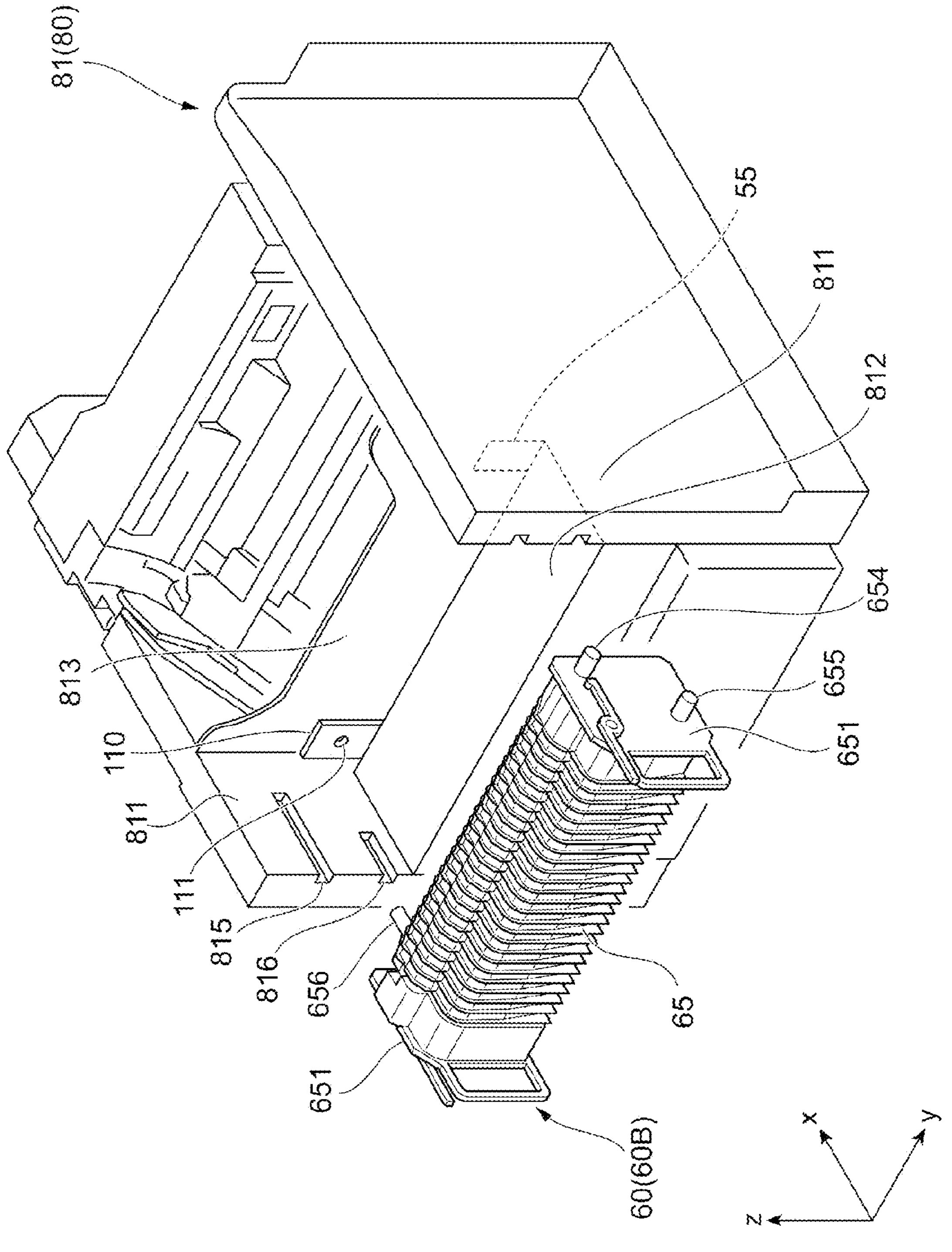
FIG. 4 is a diagram showing an example of a state in which a fixing unit is detached from a body portion.

FIG. 4 is a diagram showing an example of a state in which the fixing unit 60 is detached from the body portion 81. In FIG. 4, the DC fixing unit 60B is shown as the fixing unit 60. In addition, in FIG. 4, the image reading section 2, the paper discharge section 5, the cover portion 83 of the housing 80, and the like are omitted for easy understanding.

Figure 5:
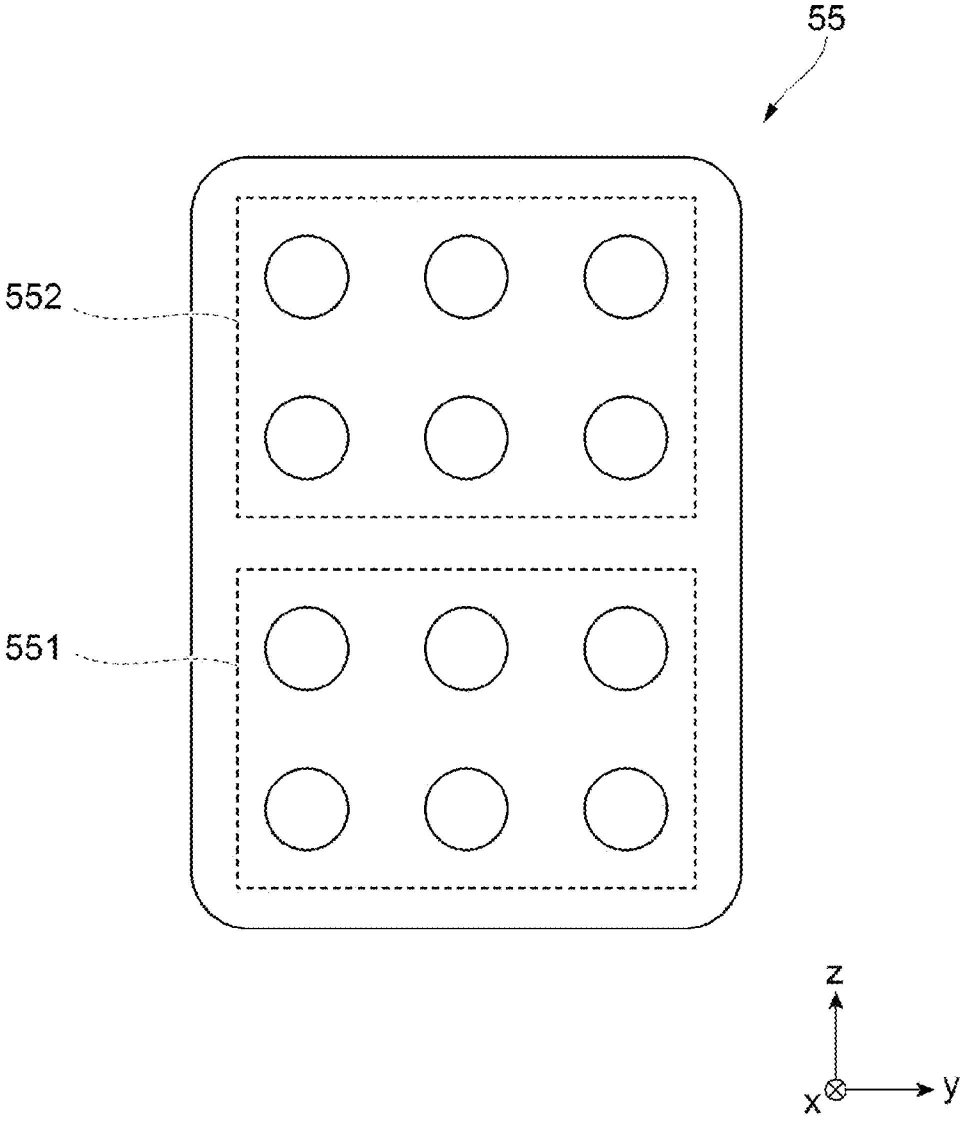
FIG. 5 is a diagram showing an example of a configuration of a connector.

FIG. 5 is a diagram showing an example of a configuration of the connector 55.

(a) and (b) of FIG. 6 are diagrams showing an example of a configuration of the fixing unit 60. (a) of FIG. 6 is a diagram of the AC fixing unit 60A as viewed in the +y direction. (b) of FIG. 6 is a diagram of the DC fixing unit 60B as viewed in the +y direction.

FIGS. 7 and 8 are diagrams showing an example of a configuration of the switching mechanism 90 to which the present exemplary embodiment is applied. FIG. 7 shows the switching mechanism 90 in a first state to be described later, and FIG. 8 shows the switching mechanism 90 in a second state to be described later.

First, a configuration of the body portion 81 of the housing 80 will be described.

The body portion 81 has two side plates 811 that extend in the x direction and the z direction, respectively, and that face each other in the y direction via a space in which the fixing unit 60 is attached. In addition, the body portion 81 has a guide plate 812 that extends between the two side plates 811 in the x direction and the y direction and that guides the fixing unit 60 inserted into the body portion 81. Further, the body portion 81 has a facing plate 813 that faces the fixing unit 60 attached to the body portion 81 and that extends between the two side plates 811 in the y direction and the z direction.

A first groove portion 815 and a second groove portion 816 cut out along the x direction are formed in the side plate 811.

The first groove portion 815 guides a first shaft portion 654 of the unit frame 65, which will be described later, in the x direction as the fixing unit 60 is attached to and detached from the body portion 81. Similarly, the second groove portion 816 guides a second shaft portion 655 of the unit frame 65, which will be described later, in the x direction as the fixing unit 60 is attached to and detached from the body portion 81.

Further, an attachment plate 110 of the attachment section 100 of the switching mechanism 90 is exposed between the guide plate 812 of the body portion 81 and the facing plate 813. In addition, the attachment plate 110 is provided at one end on the −y direction side in a space provided between the guide plate 812 and the facing plate 813. The attachment plate 110 is a plate-shaped member extending in the y direction and the z direction. In a case in which the fixing unit 60 is inserted into the body portion 81, the attachment section 100 is attached to the fixing unit 60.

The attachment section 100 will be described in detail later.

In addition, the connector 55 of the power supply device 50 described above is provided in the body portion 81. The connector 55 is, for example, attached to one end of the facing plate 813 on the +y direction side.

Examples of the connector 55 include a so-called drawer connector. In a case in which the fixing unit 60 is inserted into the body portion 81 and is attached to the attachment plate 110, a terminal (not shown) provided in the fixing unit 60 is inserted into the connector 55. The connector 55 supplies the power, which is supplied via the power supply section 51, to the fixing unit 60.

The connector 55 according to the present exemplary embodiment has a configuration that can be connected to any one of the AC fixing unit 60A or the DC fixing unit 60B. More specifically, the connector 55 has a connection portion for AC 551 to which the AC fixing unit 60A is connected and a connection portion for DC 552 to which the DC fixing unit 60B is connected.

In this example, the connector 55 is disposed such that the connection portion for AC 551 and the connection portion for DC 552 are arranged in the +z direction.

In a case in which the AC fixing unit 60A is attached to the attachment plate 110 of the attachment section 100, the AC fixing unit 60A is connected to the connection portion for AC 551 of the connector 55. Then, the power from the alternating current power supply supplied from the AC power supply port 52 of the power supply section 51 is supplied to the AC fixing unit 60A via the connection portion for AC 551.

In addition, in a case in which the DC fixing unit 60B is attached to the attachment plate 110 of the attachment section 100, the DC fixing unit 60B is connected to the connection portion for DC 552 of the connector 55. Further, the power from the direct current power supply supplied from the DC power supply port 53 of the power supply section 51 is supplied to the DC fixing unit 60B via the connection portion for DC 552.

Next, a configuration of the unit frame 65 of the fixing unit 60 will be described.

The unit frame 65 is configured by a flat surface extending in the x direction and the z direction, and includes two side walls 651 facing each other in the y direction. In addition, the unit frame 65 is configured by a flat surface extending in the y direction and the z direction, and includes a facing wall 652 facing the facing plate 813 in a case in which the fixing unit 60 is inserted into the body portion 81. In addition, the unit frame 65 is configured by a flat surface extending in the x direction and the y direction, and includes a lower wall 653 that is guided along the guide plate 812 in a case in which the fixing unit 60 is inserted into the body portion 81.

In addition, the unit frame 65 has the first shaft portion 654 and the second shaft portion 655 that protrude from each of the side walls 651 in the +y direction or the −y direction. The first shaft portion 654 is inserted into the first groove portion 815 of the body portion 81 in a case in which the fixing unit 60 is inserted into the body portion 81. In addition, the second shaft portion 655 is inserted into the second groove portion 816 of the body portion 81 in a case in which the fixing unit 60 is inserted into the body portion 81. In this way, the first shaft portion 654 is inserted into the first groove portion 815, and the second shaft portion 655 is inserted into the second groove portion 816, so that the fixing unit 60 is positioned in the z direction with respect to the body portion 81.

Further, the unit frame 65 has a pin 656 that protrudes from the facing wall 652 in the +x direction. The pin 656 is provided at one end of the facing wall 652 on the −y direction side. The pin 656 has a columnar shape with the x direction as an axis. The pin 656 is inserted into an insertion port 111 formed in the attachment plate 110 in a case in which the fixing unit 60 is inserted into the body portion 81. In addition, the fixing unit 60 is attached to the body portion 81 by being inserted into the body portion 81 and by inserting the pin 656 into the insertion port 111 of the attachment plate 110.

The pin 656 is an example of a projection.

In the present exemplary embodiment, the positions of the pins 656 in the z direction in the unit frame 65 are different between the AC fixing unit 60A and the DC fixing unit 60B.

That is, as shown in (a) of FIG. 6, the pin 656 is provided at a position at which the height of the pin 656 from the lower wall 653 in the +z direction is a height H1 in the AC fixing unit 60A. In addition, as shown in (b) of FIG. 6, in the DC fixing unit 60B, the pin 656 is provided at a position at which the height of the pin 656 from the lower wall 653 in the +z direction is a height H2 lower than the height H1.

The position of the pin 656 in the y direction is the same between the AC fixing unit 60A and the DC fixing unit 60B.

Next, the configuration of the switching mechanism 90 will be described.

The switching mechanism 90 includes the attachment section 100 to which the fixing unit 60 inserted in the body portion 81 is attached. In addition, the switching mechanism 90 includes the shutter member 200 that blocks the AC power supply port 52 or the DC power supply port 53 of the power supply section 51. In addition, the switching mechanism 90 includes a transmission section 300 that transmits the power between the attachment section 100 and the shutter member 200.

The attachment section 100 is provided to be movable in the z direction and has the attachment plate 110 to which the AC fixing unit 60A or the DC fixing unit 60B is attached. The attachment plate 110 is an example of an insertion portion.

As described above, the attachment plate 110 has a plate-like shape extending in the y direction and the z direction. The attachment plate 110 is moved in the +z direction or the −z direction in conjunction with the operation of the shutter member 200 by the transmission section 300 transmitting the power from the shutter member 200.

The attachment plate 110 is formed with the insertion port 111 that penetrates the attachment plate 110 in the x direction and into which the pin 656 provided in the unit frame 65 of the fixing unit 60 is inserted. In this example, the insertion port 111 has a circular shape that is slightly larger than an outer diameter of the pin 656.

In addition, the attachment plate 110 has a first recess portion 112 and a second recess portion 113 in which a part of the attachment plate 110 is removed in a thickness direction, on a surface of the attachment plate 110 on the +x direction side. The first recess portion 112 and the second recess portion 113 are arranged in the +z direction. Further, in this example, the first recess portion 112 is disposed below the second recess portion 113. Further, the first recess portion 112 and the second recess portion 113 have the same shape.

Further, the attachment plate 110 has a columnar slide pin 114 that protrudes to the −y direction side at an end portion on the −z direction side. The slide pin 114 is inserted into a first slide hole 311 formed in a rotation member 310 of the transmission section 300, which will be described later. The slide pin 114 slides in a longitudinal direction in the first slide hole 311 in conjunction with the operation of the rotation member 310.

In addition, the attachment section 100 has a latch member 120 that fixes the position of the attachment plate 110 moving in the z direction in conjunction with the shutter member 200.

The latch member 120 is attached to the body portion 81 to face a surface of the attachment plate 110 on the −x direction side. Unlike the attachment plate 110, the latch member 120 is fixed to the body portion 81 and does not move in the z direction.

The latch member 120 is formed with a protrusion portion 121 protruding to the attachment plate 110 side in the +x direction. Then, the latch member 120 fixes the position of the attachment plate 110 in the z direction by fitting the protrusion portion 121 into the first recess portion 112 or the second recess portion 113. In addition, the latch member 120 fixes the attachment plate 110 to a first position at which the AC fixing unit 60A can be attached by fitting the protrusion portion 121 into the first recess portion 112. In addition, the latch member 120 is provided with the protrusion portion 121 fitted in the second recess portion 113.

As a result, the attachment plate 110 is fixed to a second position at which the DC fixing unit 60B can be attached.

The shutter member 200 has a plate-like shape extending in the x direction and the y direction, and blocks the AC power supply port 52 and the DC power supply port 53 of the power supply section 51.

The shutter member 200 has an opening portion for AC 210 that exposes the AC power supply port 52 to the outside of the image forming apparatus 1 in a case in which the shutter member 200 is moved to the first position described later. In addition, the shutter member 200 has the opening portion for DC 220 that exposes the DC power supply port 53 to the outside of the image forming apparatus 1 in a case in which the shutter member 200 is moved to the second position described later.

The opening portion for AC 210 has a shape corresponding to the AC power supply port 52 as viewed in the +y direction. In this example, a size of the opening portion for AC 210 is slightly larger than a size of the AC power supply port 52 as viewed in the +y direction.

Similarly, the opening portion for DC 220 has a shape corresponding to the DC power supply port 53 as viewed in the +y direction. In this example, a size of the opening portion for DC 220 as viewed in the +y direction is slightly larger than a size of the DC power supply port 53.

In the shutter member 200 according to the present exemplary embodiment, the opening portion for AC 210 and the opening portion for DC 220 are arranged in the +z direction. In addition, in this example, the opening portion for AC 210 is disposed below the opening portion for DC 220.

A distance between the opening portion for AC 210 and the opening portion for DC 220 in the z direction in the shutter member 200 is shorter than a distance between the AC power supply port 52 and the DC power supply port 53 in the power supply section 51.

Further, the shutter member 200 has a columnar slide pin 230 that protrudes to the −y direction side at an end portion on the +z direction side. The slide pin 230 is inserted into a second slide hole 312 formed in the rotation member 310 of the transmission section 300. The slide pin 230 slides in the longitudinal direction in the second slide hole 312 in conjunction with the operation of the rotation member 310.

The transmission section 300 transmits the power between the attachment plate 110 of the attachment section 100 and the shutter member 200, to move the attachment plate 110 or the shutter member 200. The transmission section 300 is an example of a switching section that switches the attachment plate 110 and the shutter member 200 of the attachment section 100 between the first state and the second state.

The transmission section 300 includes the rotation member 310 that is rotatable about a rotation axis 320 with the y direction as an axial direction. The rotation member 310 has a long plate shape extending in the x direction and the z direction, and connects the attachment plate 110 and the shutter member 200 to each other.

The first slide hole 311 extending in the longitudinal direction of the rotation member 310 is formed in an end portion of the rotation member 310 on the attachment plate 110 side. The slide pin 114, which is provided on the attachment plate 110, is inserted into first slide hole 311 so as to be slidable in the longitudinal direction.

In addition, the second slide hole 312 extending in the longitudinal direction of the rotation member 310 is formed in the rotation member 310 at an end portion on the shutter member 200 side. The slide pin 230, which is provided in the shutter member 200, is inserted into the second slide hole 312 so as to be slidable in the longitudinal direction.

In addition, the rotation member 310 is rotationally biased by a spring member 330 such that the rotation member 310 rotates clockwise about the rotation axis 320.

Operation of Switching Mechanism 90

Subsequently, an operation of the switching mechanism 90 will be described. The switching mechanism 90 according to the present exemplary embodiment switches the attachment section 100 and the shutter member 200 between the first state and the second state.

Here, the first state is a state of the attachment section 100 in which the AC fixing unit 60A is attachable and the DC fixing unit 60B is not attachable. In addition, the first state is a state in which the shutter member 200 blocks the DC power supply port 53 and inhibits the supply of the power from the direct current power supply to the DC power supply port 53.

In addition, the second state is a state of the attachment section 100 in which the DC fixing unit 60B is attachable and the AC fixing unit 60A is not attachable. In addition, the second state is a state in which the shutter member 200 blocks the AC power supply port 52 and inhibits the supply of the power from the alternating current power supply to the AC power supply port 52.

First, a case will be described in which the attachment section 100 and the shutter member 200 are switched to the first state by the switching mechanism 90. As described above, FIG. 7 shows the switching mechanism 90 in the first state.

In the first state, the shutter member 200 is moved to the first position for blocking the DC power supply port 53 of the power supply section 51. At the first position, the opening portion for AC 210 of the shutter member 200 and the AC power supply port 52 of the power supply section 51 overlap with each other in the y direction. In addition, the AC power supply port 52 is exposed to the outside of the image forming apparatus 1 via the opening portion for AC 210 of the shutter member 200.

Accordingly, in a case in which the shutter member 200 is at the first position, it is possible to insert the AC power supply cable into the AC power supply port 52. The image forming apparatus 1 can receive the power supplied from the alternating current power supply via the AC power supply port 52.

In addition, as shown in FIG. 7, in a case in which the shutter member 200 is at the first position, the opening portion for DC 220 of the shutter member 200 is shifted from the DC power supply port 53 of the power supply section 51 in the −z direction. In this case, the DC power supply port 53 is in a state of being blocked by the shutter member 200.

Accordingly, in a case in which the shutter member 200 is at the first position, the DC power supply cable cannot be inserted into the DC power supply port 53. In this case, the image forming apparatus 1 cannot receive the power supplied from the direct current power supply via the DC power supply port 53.

In a case in which the shutter member 200 is moved from the second position to the first position, the rotation member 310 rotates counterclockwise about the rotation axis 320 as the shutter member 200 moves in the −z direction. More specifically, the slide pin 230 moves in the −z direction while sliding in the second slide hole 312 as the shutter member 200 moves in the −z direction. Accordingly, the rotation member 310 rotates counterclockwise.

In addition, as the rotation member 310 rotates counterclockwise, the attachment plate 110 of the attachment section 100 moves in the +z direction. More specifically, as the rotation member 310 rotates counterclockwise, the slide pin 114 moves in the +z direction while sliding in the longitudinal direction in the first slide hole 311. Accordingly, the attachment plate 110 moves in the +z direction.

In a case in which the position of the first recess portion 112 of the attachment plate 110 in the z direction coincides with the position of the protrusion portion 121 of the latch member 120 in the z direction, the protrusion portion 121 is fitted into the first recess portion 112. As a result, the position of the attachment plate 110 in the z direction is fixed. More specifically, the attachment plate 110 is fixed to the first position at which the AC fixing unit 60A can be attached.

Furthermore, the protrusion portion 121 is fitted into the second recess portion 113, and the position of the attachment plate 110 in the z direction is fixed, so that the positions of the rotation member 310 and the shutter member 200 are fixed.

Here, at the first position, a distance in the z direction from the guide plate 812 of the body portion 81 to the insertion port 111 of the attachment plate 110 is equal to the height H1 of the pin 656 in the AC fixing unit 60A.

Accordingly, in a case in which the AC fixing unit 60A is inserted into the body portion 81 such that the lower wall 653 is along the guide plate 812, the pin 656 is inserted into the insertion port 111. Then, the AC fixing unit 60A is attached to the attachment section 100.

On the other hand, at the first position, the distance in the z direction from the guide plate 812 of the body portion 81 to the insertion port 111 of the attachment plate 110 is different from the height H2 of the pin 656 in the DC fixing unit 60B. Accordingly, even in a case in which the lower wall 653 of the DC fixing unit 60B is inserted into the body portion 81 along the guide plate 812, the pin 656 cannot be inserted into the insertion port 111. In this case, the DC fixing unit 60B cannot be attached to the attachment section 100.

For example, in a case in which the attachment section 100 and the shutter member 200 are in the first state and the AC power supply cable is inserted into the AC power supply port 52, the DC fixing unit 60B cannot be attached to the attachment plate 110 of the attachment section 100.

In addition, in a case in which the attachment section 100 and the shutter member 200 are in the first state, the DC power supply port 53 is blocked by the shutter member 200. In a case in which the AC fixing unit 60A is attached to the attachment section 100, the DC power supply cable cannot be inserted into the DC power supply port 53.

Subsequently, a case will be described in which the attachment section 100 and the shutter member 200 are switched to the second state by the switching mechanism 90. As described above, FIG. 8 shows the switching mechanism 90 in the second state.

In the second state, the shutter member 200 is moved to the second position for blocking the AC power supply port 52 of the power supply section 51. At the second position, the opening portion for DC 220 of the shutter member 200 and the DC power supply port 53 of the power supply section 51 overlap with each other in the y direction. In addition, the DC power supply port 53 is exposed to the outside of the image forming apparatus 1 via the opening portion for DC 220 of the shutter member 200.

Accordingly, in a case in which the shutter member 200 is at the second position, it is possible to insert the DC power supply cable into the DC power supply port 53. The image forming apparatus 1 can receive the power supplied from the direct current power supply via the DC power supply port 53.

In addition, as shown in FIG. 8, in a case in which the shutter member 200 is at the second position, the opening portion for AC 210 of the shutter member 200 is shifted from the AC power supply port 52 of the power supply section 51 in the +z direction. In this case, a part of the region of the AC power supply port 52 on the −z direction side is in a state of being blocked by the shutter member 200.

Accordingly, in a case in which the shutter member 200 is at the second position, the AC power supply cable cannot be inserted into the AC power supply port 52. In this case, the image forming apparatus 1 cannot receive the power supplied from the alternating current power supply via the AC power supply port 52.

In a case in which the shutter member 200 is moved from the first position to the second position, the rotation member 310 rotates clockwise about the rotation axis 320 as the shutter member 200 moves in the +z direction. More specifically, the slide pin 230 moves in the −z direction while sliding in the second slide hole 312 as the shutter member 200 moves in the +z direction. Accordingly, the rotation member 310 rotates clockwise.

In addition, as the rotation member 310 rotates clockwise, the attachment plate 110 of the attachment section 100 moves in the −z direction. More specifically, as the rotation member 310 rotates clockwise, the slide pin 114 moves in the −z direction while sliding in the longitudinal direction in the first slide hole 311. Accordingly, the attachment plate 110 moves in the −z direction.

In a case in which the position of the second recess portion 113 of the attachment section 100 in the z direction coincides with the position of the protrusion portion 121 of the latch member 120 in the z direction, the protrusion portion 121 is fitted into the second recess portion 113. As a result, the position of the attachment plate 110 in the z direction is fixed. More specifically, the attachment plate 110 is fixed to the second position at which the DC fixing unit 60B can be attached.

Furthermore, the protrusion portion 121 is fitted into the second recess portion 113, and the position of the attachment plate 110 in the z direction is fixed, so that the positions of the rotation member 310 and the shutter member 200 are fixed.

Here, at the second position, the distance in the z direction from the guide plate 812 of the body portion 81 to the insertion port 111 of the attachment plate 110 is equal to the height H2 of the pin 656 in the DC fixing unit 60B.

Accordingly, in a case in which the DC fixing unit 60B is inserted into the body portion 81 such that the lower wall 653 is along the guide plate 812, the pin 656 is inserted into the insertion port 111. Then, the DC fixing unit 60B is attached to the attachment section 100.

On the other hand, at the second position, the distance in the z direction from the guide plate 812 of the body portion 81 to the insertion port 111 of the attachment plate 110 is different from the height H1 of the pin 656 in the AC fixing unit 60A. Accordingly, even in a case in which the lower wall 653 of the AC fixing unit 60A is inserted into the body portion 81 along the guide plate 812, the pin 656 cannot be inserted into the insertion port 111.

For example, in a case in which the attachment section 100 and the shutter member 200 are in the second state and the DC power supply cable is inserted into the DC power supply port 53, the AC fixing unit 60A cannot be attached to the attachment plate 110 of the attachment section 100.

In addition, in a case in which the attachment section 100 and the shutter member 200 are in the second state, the AC power supply port 52 is blocked by the shutter member 200. In a case in which the DC fixing unit 60B is attached to the attachment section 100, the AC power supply cable cannot be inserted into the AC power supply port 52.

As described above, in the image forming apparatus 1 according to the present exemplary embodiment, the attachment of the AC fixing unit 60A to the attachment section 100 and the insertion of the DC power supply cable into the DC power supply port 53 are not executable simultaneously. In addition, in the image forming apparatus 1 according to the present exemplary embodiment, the attachment of the DC fixing unit 60B to the attachment section 100 and the insertion of the AC power supply cable into the AC power supply port 52 are not executable simultaneously by the operation of the switching mechanism 90.

Accordingly, the power that cannot be used for the AC fixing unit 60A or the DC fixing unit 60B is prevented from being supplied.

Exemplary Embodiment 2

The switching mechanism 90 according to Exemplary Embodiment 1 switches between the first state and the second state by interlocking the movement of the attachment plate 110 of the attachment section 100 in the z direction and the movement of the shutter member 200 in the z direction by the rotation member 310. However, the aspect in which the switching mechanism 90 switches the attachment section 100 and the shutter member 200 between the first state and the second state is not limited thereto.

FIGS. 9 to 11 are diagrams showing an example of a configuration of a switching mechanism 90 to which Exemplary Embodiment 2 is applied. FIG. 9 is a diagram showing the switching mechanism 90 in the first state, and the AC fixing unit 60A is attached to the attachment section 100. FIG. 10 is a diagram showing the switching mechanism 90 in the second state, and the DC fixing unit 60B is attached to the attachment section 100. FIG. 11 is a diagram showing the switching mechanism 90 in a third state, and the fixing unit 60 is not attached to the attachment section 100.

In the present exemplary embodiment, the first state is a state in which the shutter member 200 blocks the DC power supply port 53 and inhibits the supply of power from the direct current power supply to the DC power supply port 53. In addition, the second state is a state in which the shutter member 200 blocks the AC power supply port 52 and inhibits the supply of power from the alternating current power supply to the AC power supply port 52. In addition, the third state is a state in which the shutter member 200 blocks both the AC power supply port 52 and the DC power supply port 53.

The fixing unit 60 according to Exemplary Embodiment 2 includes a projection portion 66 that protrudes from the facing wall 652 in the +x direction in the unit frame 65. The projection portion 66 is, for example, provided at one end of the facing wall 652 on the −y direction side.

In the present exemplary embodiment, the positions of the projection portions 66 in the z direction in the unit frame 65 are different between the AC fixing unit 60A and the DC fixing unit 60B. Specifically, in the AC fixing unit 60A, the projection portion 66 is provided on the −z direction side as compared with the DC fixing unit 60B. The shape of the projection portion 66 is the same between the AC fixing unit 60A and the DC fixing unit 60B.

The switching mechanism 90 includes the attachment section 100, the shutter member 200, and the transmission section 300.

The attachment section 100 has a frame 140 to which the AC fixing unit 60A or the DC fixing unit 60B is attached. The frame 140 is fixed to the body portion 81 (see FIG. 4), and the AC fixing unit 60A and the DC fixing unit 60B are attached to the same position.

In a case in which the AC fixing unit 60A and the DC fixing unit 60B are attached to the frame 140, an opening 141 is provided such that the projection portion 66 can protrude from the frame 140 in the +x direction.

The transmission section 300 includes the rotation member 310 that is rotatable about the rotation axis 320 with the y direction as the axial direction. The rotation member 310 is rotationally biased by the spring member 330 such that the rotation member 310 rotates clockwise about the rotation axis 320.

In addition, the transmission section 300 has a facing member 340 facing the frame 140 of the attachment section 100 from the +x direction side. The facing member 340 is connected to the shutter member 200 via the rotation member 310.

The facing member 340 has a plate-like shape extending in the y direction and the z direction in a case in which the fixing unit 60 is not attached to the frame 140.

The facing member 340 has a columnar slide pin 350 that protrudes to the −y direction side at an end portion on the −z direction side. The slide pin 350 is inserted into the first slide hole 311 formed in the rotation member 310. The slide pin 350 slides in the longitudinal direction in the first slide hole 311 in conjunction with the operation of the rotation member 310.

In addition, the facing member 340 is provided to be rotatable about the rotation axis 360, which is provided on the +z direction side with respect to the slide pin 350, with the y direction as an axial direction.

The shutter member 200 has a plate-like shape extending in the x direction and the y direction, and has a shutter body portion 201 in which the opening portion for AC 210 and the opening portion for DC 220 are formed. In addition, the shutter member 200 has a columnar shape with the y direction as an axial direction, and has a slide pin 202 that is inserted into the second slide hole 312 of the rotation member 310 so as to be slidable. In addition, the shutter member 200 has a connection portion 203 that has one end fixed to the shutter body portion 201 and the other end fixed to the slide pin 202, and that connects the shutter body portion 201 and the slide pin 202.

Subsequently, the operation of the switching mechanism 90 will be described. The switching mechanism 90 according to the present exemplary embodiment switches the shutter member 200 among the first state, the second state, and the third state in response to the attachment of the fixing unit 60 to the attachment section 100.

The switching mechanism 90 according to the present exemplary embodiment switches the shutter member 200 to the third state in a case in which the fixing unit 60 is not attached to the attachment section 100.

Specifically, in a case in which the fixing unit 60 is not attached to the attachment section 100, the facing member 340 faces the frame 140 in a state of being along the y direction and the z direction. The shutter body portion 201 of the shutter member 200 is at the third position for blocking both the AC power supply port 52 and the DC power supply port 53 of the power supply section 51.

Therefore, in a case in which the shutter member 200 is in the third state, neither the AC power supply cable nor the DC power supply cable can be inserted into the power supply section 51.

In addition, the switching mechanism 90 according to the present exemplary embodiment switches the shutter member 200 to the first state in a case in which the AC fixing unit 60A is attached to the attachment section 100.

Specifically, in a case in which the AC fixing unit 60A is attached to the frame 140, the projection portion 66 of the AC fixing unit 60A protrudes from the opening 141 to the +x direction side. Then, the facing member 340 is pushed to the +x direction side by the protruding projection portion 66. In addition, the projection portion 66 pushes a portion of the facing member 340 on the +z direction side with respect to the rotation axis 360 to the +x direction side.

Accordingly, the facing member 340 rotates counterclockwise about the rotation axis 360.

In addition, as the facing member 340 rotates counterclockwise, the slide pin 350 provided in the facing member 340 moves in the +z direction. More specifically, the slide pin 350 moves in the +z direction while sliding in the longitudinal direction of the first slide hole 311 as the facing member 340 rotates counterclockwise.

Then, as the slide pin 350 moves in the +z direction, the rotation member 310 rotates counterclockwise about the rotation axis 320.

Further, the slide pin 202 of the shutter member 200 moves in the −z direction while sliding in the longitudinal direction in the second slide hole 312 as the rotation member 310 rotates counterclockwise.

Then, the shutter body portion 201 connected to the slide pin 202 via the connection portion 203 moves in the −z direction.

As described above, as shown in FIG. 9, the shutter body portion 201 of the shutter member 200 is moved to the first position for blocking the DC power supply port 53 of the power supply section 51. At the first position, the AC power supply port 52 is exposed to the outside of the image forming apparatus 1 via the opening portion for AC 210 of the shutter body portion 201.

Accordingly, in a case in which the shutter body portion 201 of the shutter member 200 is at the first position, the AC power supply cable can be inserted into the AC power supply port 52. The image forming apparatus 1 can receive the power supplied from the alternating current power supply via the AC power supply port 52.

In addition, the switching mechanism 90 according to the present exemplary embodiment switches the shutter member 200 to the second state in a case in which the DC fixing unit 60B is attached to the attachment section 100.

Specifically, in a case in which the DC fixing unit 60B is attached to the frame 140, the projection of the DC fixing unit 60B protrudes from the opening 141 to the +x direction side. Then, the facing member 340 is pushed to the +x direction side by the protruding projection portion 66. In addition, the projection portion 66 pushes a portion of the facing member 340 on the +z direction side with respect to the rotation axis 360 to the +x direction side.

Accordingly, the facing member 340 rotates counterclockwise about the rotation axis 360.

Further, as in the first state described above, the rotation member 310 rotates counterclockwise about the rotation axis 320 as the facing member 340 rotates counterclockwise.

Further, the shutter body portion 201 moves in the −z direction as the rotation member 310 rotates counterclockwise.

Here, in the DC fixing unit 60B, the projection portion 66 is provided on the +z direction side as compared with the AC fixing unit 60A. Therefore, a counterclockwise rotation amount of the facing member 340 that is pushed to the +x direction side by the projection portion 66 is smaller in a case in which the DC fixing unit 60B is attached than in a case in which the AC fixing unit 60A is attached.

Therefore, a movement amount of the shutter member 200 that moves in the −z direction by the transmission of the rotation of the facing member 340 is smaller in the second state than in the first state.

Accordingly, in the second state, as shown in FIG. 10, the shutter body portion 201 of the shutter member 200 is moved to the second position for blocking the AC power supply port 52 of the power supply section 51. At the second position, the DC power supply port 53 is exposed to the outside of the image forming apparatus 1 via the opening portion for DC 220 of the shutter body portion 201.

Accordingly, in a case in which the shutter body portion 201 of the shutter member 200 is at the second position, the DC power supply cable can be inserted into the DC power supply port 53. The image forming apparatus 1 can receive the power supplied from the direct current power supply via the DC power supply port 53.

Although the exemplary embodiments of the present invention have been described above, the technical scope of the present invention is not limited to the scope described in the above-described exemplary embodiments. It is evident from the description of the claims that various modifications or improvements made to the above-described exemplary embodiments are also included within the technical scope of the present invention.

SUPPLEMENTARY NOTE (((1)))

An image forming apparatus comprising:

an attachment section to which a first fixing unit that performs a fixing operation of fixing an image on a recording material by using power from an alternating current power supply and a second fixing unit that performs the fixing operation by using power from a direct current power supply are attached;

an alternating current power supply section that receives the power supplied from the alternating current power supply; and a direct current power supply section that receives the power supplied from the direct current power supply, wherein the attachment of the first fixing unit to the attachment section and the supply of the power from the direct current power supply to the direct current power supply section are not executable simultaneously, and the attachment of the second fixing unit to the attachment section and the supply of the power from the alternating current power supply to the alternating current power supply section are not executable simultaneously.

(((2)))

The image forming apparatus according to (((1))), further comprising:

a shutter member that blocks the alternating current power supply section to inhibit the supply of the power from the alternating current power supply to the alternating current power supply section, or that blocks the direct current power supply section to inhibit the supply of the power from the direct current power supply to the direct current power supply section.

(((3)))

The image forming apparatus according to (((2))), wherein the shutter member blocks the direct current power supply section in a case in which the first fixing unit is attached to the attachment section.

(((4)))

The image forming apparatus according to (((2))), wherein the shutter member blocks the alternating current power supply section in a case in which the second fixing unit is attached to the attachment section.

(((5)))

The image forming apparatus according to any one of (((2))) to (((4))), further comprising:

a switching section that operates in conjunction with the shutter member to switch the attachment section between a first state in which the first fixing unit is attachable and the second fixing unit is not attachable and a second state in which the first fixing unit is not attachable and the second fixing unit is attachable.

(((6)))

The image forming apparatus according to (((5))), wherein the switching section switches the attachment section to the first state in a case in which the direct current power supply section is blocked by the shutter member.

(((7)))

The image forming apparatus according to (((5))) or (((6))), wherein the switching section switches the attachment section to the second state in a case in which the alternating current power supply section is blocked by the shutter member.

(((8)))

The image forming apparatus according to any one of (((5))) to (((7))), wherein the attachment section includes an insertion portion into which a projection provided on the first fixing unit or the second fixing unit is inserted, and the switching section allows the projection of the first fixing unit to be inserted into the insertion portion and inhibits the projection of the second fixing unit from being inserted into the insertion portion in the first state, and inhibits the projection of the first fixing unit from being inserted into the insertion portion and allows the second fixing unit to be inserted into the insertion portion in the second state.

(((9)))

The image forming apparatus according to (((8))), wherein the shutter member moves between a first position for blocking the direct current power supply section and a second position for blocking the alternating current power supply section, and the switching section switches between the first state and the second state by moving a position of the insertion portion in conjunction with the movement of the shutter member.

(((10)))

The image forming apparatus according to (((9))), wherein a position of the projection is different between the first fixing unit and the second fixing unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an attachment section to which a first fixing unit that performs a fixing operation of fixing an image on a recording material by using power from an alternating current power supply and a second fixing unit that performs the fixing operation by using power from a direct current power supply are attached;

an alternating current power supply section that receives the power supplied from the alternating current power supply; and a direct current power supply section that receives the power supplied from the direct current power supply, wherein the attachment of the first fixing unit to the attachment section and the supply of the power from the direct current power supply to the direct current power supply section are not executable simultaneously, and the attachment of the second fixing unit to the attachment section and the supply of the power from the alternating current power supply to the alternating current power supply section are not executable simultaneously.

2. The image forming apparatus according to claim 1, further comprising:

a shutter member that blocks the alternating current power supply section to inhibit the supply of the power from the alternating current power supply to the alternating current power supply section, or that blocks the direct current power supply section to inhibit the supply of the power from the direct current power supply to the direct current power supply section.

3. The image forming apparatus according to claim 2, wherein the shutter member blocks the direct current power supply section in a case in which the first fixing unit is attached to the attachment section.

4. The image forming apparatus according to claim 2, wherein the shutter member blocks the alternating current power supply section in a case in which the second fixing unit is attached to the attachment section.

5. The image forming apparatus according to claim 2, further comprising:

a switching section that operates in conjunction with the shutter member to switch the attachment section between a first state in which the first fixing unit is attachable and the second fixing unit is not attachable and a second state in which the first fixing unit is not attachable and the second fixing unit is attachable.

6. The image forming apparatus according to claim 5, wherein the switching section switches the attachment section to the first state in a case in which the direct current power supply section is blocked by the shutter member.

7. The image forming apparatus according to claim 5, wherein the switching section switches the attachment section to the second state in a case in which the alternating current power supply section is blocked by the shutter member.

8. The image forming apparatus according to claim 5, wherein the attachment section includes an insertion portion into which a projection provided on the first fixing unit or the second fixing unit is inserted, and the switching section allows the projection of the first fixing unit to be inserted into the insertion portion and inhibits the projection of the second fixing unit from being inserted into the insertion portion in the first state, and inhibits the projection of the first fixing unit from being inserted into the insertion portion and allows the second fixing unit to be inserted into the insertion portion in the second state.

9. The image forming apparatus according to claim 8, wherein the shutter member moves between a first position for blocking the direct current power supply section and a second position for blocking the alternating current power supply section, and the switching section switches between the first state and the second state by moving a position of the insertion portion in conjunction with the movement of the shutter member.

10. The image forming apparatus according to claim 9, wherein a position of the projection is different between the first fixing unit and the second fixing unit.

* * * * *